July 9, 1968          H. E. JACKSON          3,392,172
PROCESS FOR THE PREPARATION OF MELAMINE FROM UREA
Filed March 23, 1966
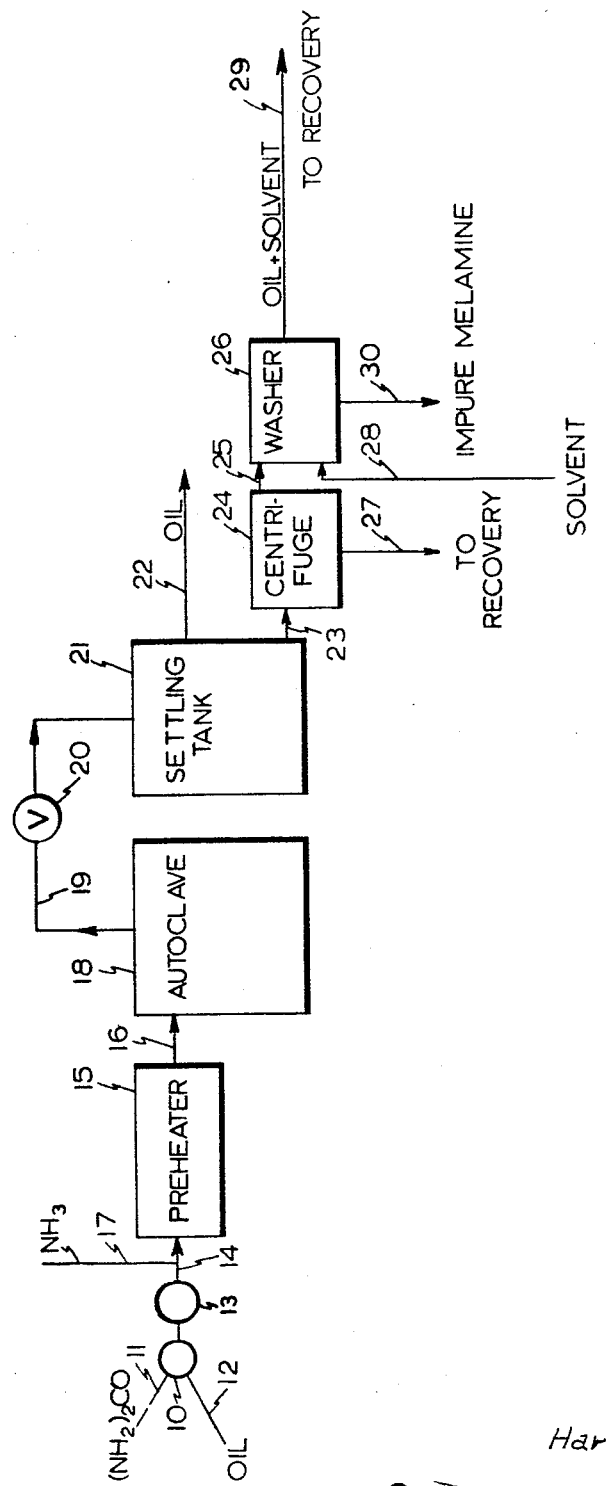
Inventor
Harry E. Jackson
Stevens, Davis, Miller & Mosher
Attorneys 3,392,172
PROCESS FOR THE PREPARATION OF
MELAMINE FROM UREA
Harry E. Jackson, Rossland, British Columbia, Canada, assignor to Cominco Ltd.-Cominco Ltee., a corporation of Canada
Filed Mar. 23, 1966, Ser. No. 536,859
Claims priority, application Canada, Apr. 5, 1965, 927,341, Patent 743,956
9 Claims. (Cl. 260—249.7)

This invention relates to the production of melamine. It is particularly directed to an improved process for the production of melamine by the pyrolysis of urea in the presence of added ammonia in a reaction zone and in the presence of an inert organic liquid.

Melamine is a white crystalline compound having the formula $C_3N_6H_6$. It is known that it can be produced by pyrolysis of urea as represented by the equation:

$$6CO(NH_2)_2 + Heat \rightarrow C_3N_6H_6 + 6NH_3 + 3CO_2$$

The pyrolysis is conducted at a temperature appreciably above about 400° C. in order to obtain a satisfactory yield of melamine in the reaction product within a reasonable time. Actually, some melamine can be produced at temperatures below 400° C., but only after several hours, and to produce satisfactory yields in half an hour or less requires temperatures of some 500° to 600° C. This procedure has the disadvantages of operating at relatively higher temperature and pressure which require costly, high pressure, corrosion resistant materials and under such conditions the formation of undesired condensation products such as ammeline, melam, melem and melon is favoured.

Recently, there has been developed a process wherein the reaction is carried out in the presence of added ammonia in an autoclave and in the presence of an inert organic liquid.

Such inert organic liquids were stated to be compounds or mixtures of compounds, which do not take part in the chemical reaction and are sufficiently stable under the conditions of the reaction; they must not be liable to resin formation or carbonization and the like, which would affect the smooth progress of the reaction. Examples of such liquids were given as organic liquids, which are not, or only difficultly, inflammable and have high boiling points, for instance liquids which have a critical temperature above 350° C. and a boiling point above 150° C., such as, for instance, decahydronaphthalene (decalin), tetrahydronaphthalene (tetralin), and the mixture of diphenyl oxide and diphenyl known under the name of Diphyl.

According to the aforesaid procedure, the amount of organic liquid added was to be sufficient to obtain a wetting out of the urea and to provide at reaction temperature a mixture which forms a readily pumpable mash. It was stated that larger amounts of liquid do not affect the reaction.

However, while the aforesaid process may be effective for a "batch" type process, it is not readily adaptable, per se, for a continuous process.

By a broad aspect of the present invention there is now provided a continuous process for the preparation of melamine from urea which process comprises:

(a) continuously forming a dispersion of urea in an inert liquid;

(b) continuously adding ammonia to said dispersion to produce an ammonia-containing dispersion;

(c) continuously preheating said ammonia-containing dispersion to a temperature not exceeding 250° C.;

(d) continuously passing said preheated ammonia-containing dispersion into a reaction zone maintained at a temperature of 330–350° C. and at an elevated pressure;

(e) continuously withdrawing a mixture of inert liquid and reaction products from said reaction zone; and (f) recovering melamine from said withdrawn mixture.

By another aspect of this invention the pressure within said reaction zone is maintained within the range of 1000–4000 p.s.i. By still another aspect of this invention, the pressure in said reaction zone is maintained within the range of 1000–4000 p.s.i., the retention time within said reaction zone being 20–25 minutes;

By a still further aspect of this invention, the recovery of said melamine from said withdrawn mixture includes the steps of:

(a) separating reaction product from said inert liquid;

(b) recycling said inert liquid to the dispersion-forming step; and (c) recovering substantially pure melamine from said separated reaction product.

Specifically, a continuous stream of a dispersion of urea in white oil is mixed with ammonia, and the mixture is heated to a temperature of about 250° C. and is then added to an autoclave maintained at 330–350° C. Sufficient ammonia is added to the autoclave with the dispersion to maintain a perssure of 1000–4000 p.s.i. Time of retention of the reaction mixture in the autoclave is 20–25 minutes. The suspension withdrawn from the autoclave passes to a receiver and then to a settling vessel from which the clarified oil is recycled to the process. The settled reaction product is centrifuged, washed with a solvent to remove oil, and treated by known means for the recovery of pure melamine such as that described in Canadian Patent No. 576,312, issued May 19, 1959 to The Consolidated Mining and Smelting Company of Canada Limited.

The accompanying drawing is a schematic flow diagram of a preferred process of the present invention.

As indicated in the drawing, urea from line 11 and "oil" from line 12 are passed into vessel 10, where they are formed into a dispersion. Any suitable manner of forming a dispersion of urea in "oil" may be used, but one manner preferred is to use a ball-mill.

After about 48 hours' milling most of the urea particles are only a few microns in size and do not settle readily. The dispersion formed in this manner may be pumped through lines and valves without difficulty. Usually, one part by weight of urea is milled with five parts by weight of oil, using porcelain balls. The resulting dispersion may be diluted with additional oil if desired.

With respect to the "oil," any inert liquid is suitable provided that it remains liquid throughout the reaction and does not itself react during the process. A particularly preferred oil is White Oil No. 9, which is highly refined paraffinic hydrocarbon oil.

The ratio of urea to oil may be varied at will, provided that the dispersion is fluid enough to be pumped and to flow readily through valves and pipelines. A ratio of urea to oil ranging between 1:5 and 1:8 parts by weight is preferred.

Oil and urea can form clathrate compounds. These form over a period of time and make the dispersion thicker so it cannot be easily handled. Accordingly, it is preferable to utilize freshly made mixtures. The urea-oil mixture should be used within three or four days (i.e., within a day or two after milling). Mixtures a week or more old become more difficult to pump and are visibly more viscous than fresh material.

The urea-oil dispersion is heated, for example, by means of a preheater 15. Preheating is required as the reaction is endothermic and a good deal of heat must be added to the reaction zone (which may preferably be an autoclave) to heat the incoming material to reaction temperature and to ensure that the reaction continues.

Ammonia is added to the dispersion before the preheating step, for example, via line 17. It has been found that the temperature in the preheating step should not exceed 250° C. With higher temperatures, the urea tends to form a viscous mass or a solid material, and in each case the resulting mixture cannot be readily handled in lines and pumps. It is known that if urea is added to oil at 200–250° C. at atmospheric pressure, a gummy material is formed in the oil. It has been found that the dispersion of urea in oil formed in the present process may be heated up to 250° C., if ammonia is present, without encountering difficulty in pumping and handling the mixture. Heating beyond this temperature results in plugging owing to solidification of urea reaction products, e.g., cyanuric acid and its derivatives.

After being heated, the ammonia-containing dispersion is passed through line 16 to the reaction zone, i.e., to the autoclave 18.

In one particular means of operation, ammonia is added via line 17 to the urea-oil dispersion in line 14 between the dispersion pump 13 and the preheater 15, and the combined stream is charged to the preheater and then to the autoclave 18. If desired, some of the ammonia can be added between the preheater and the autoclave. However, it is essential that ammonia be present during the preheating step, and therefore it is usually more convenient to add all the ammonia through line 17. The exact state of the combined stream is a matter of conjecture. Ammonia and urea are soluble in each other; ammonia is somewhat soluble in oil; the temperature of the combined stream is above the normal melting temperature of urea, and above the critical temperature of ammonia.

The combined stream is continuously fed to the upper part of the autoclave 18 and the suspension of reaction product in oil is withdrawn from the lower part of the autoclave via line 19.

In the operation of the present invention, it has been found that for continuous operation the reaction temperature must be above 330° C., preferably between 330 and 350° C. The temperature could be above 350° C. although such high temperatures are uneconomic and are difficult to maintain. Also, at these high temperatures the mixture becomes excessively corrosive. It has been found that below 330° C. it is not possible to remove all the reaction product from the autoclave with the oil. The oil itself remains fluid and would continue to flow from the autoclave at 330° C., or for example, at 300° C., but the reaction product appears to build up on the bottom and walls of the autoclave. It may be that above 330° C. the melamine is molten and thus is more readily suspended in the oil and that below 330° C. it is solid and rapidly settles. In any case, it has been found that the minimum reaction temperature should be at least 330° C.

The pressure in the reaction zone, e.g., autoclave, can be from 1000 to 4000 p.s.i. without significant difference in yields. The pressure is not too critical, but should be at least 1000 p.s.i. It can be higher than 4000 p.s.i. but there appears to be no advantage in using higher pressures. It has been found that satisfactory results are obtained at pressures of 1500 to 2500 p.s.i. The pressure is controlled by the ammonia added with the oil and urea fed into the reaction zone, e.g., autoclave. Urea decomposes to give ammonia and carbon dioxide during the reaction; however, with added ammonia the pressure conditions and other conditions in the autoclave can be more easily controlled.

With respect to the retention time in the autoclave, it has been found that an apparent time under synthesis conditions of 20–25 minutes is sufficient. Shorter times result in lower yields and longer times provide no additional yield.

It has also been found that an aluminum-lined autoclave is satisfactory. Titanium has also been used in processes involving urea pyrolysis. Stainless steel was too severely attacked to be practicable in the present process.

In practising the present invention the oil is separated from the reaction product and recycled. This separation can be effected by settling and decanting followed by filtration or centrifugation.

Thus, the suspension of reaction products from the reaction zone, e.g., autoclave 18 passes through line 19 and let-down valve 20 to a receiver, in this case a settling tank 21. By means of the let-down valve, the pressure is reduced to atmospheric pressure. The oil is decanted off through line 22 and may be recycled to oil inlet line 12. The residue from settling tank 21 passes via line 23 to a centrifuge 24, from where reaction product containing some oil is passed via line 25 to washer 26 and oil is withdrawn via line 27 and reclaimed. The oil remaining in the reaction product after these steps is removed by washing with a volatile solvent entering washer 26 via line 28. The volatile solvent may be petroleum ether i.e., a pentane-hexane mixture. However, in large scale operations liquefied petroleum gas may be used.

Oil and solvent are withdrawn from washer 26 via line 29 and they may be treated to recover both the oil and solvent for reuse. The impure melamine, recovered via line 30 may be purified according to the teachings of Canadian Patent 576,312, issued May 19, 1959 to B. McDonnell, assignor to The Consolidated Mining and Smelting Company of Canada Limited. Such purification may be summarized as follows:

Following this washing step in washer 26, the reaction product is leached with boiling water to which is added activated carbon, a filter aid and excess lime to ensure a pH around 11.5. The resulting mixture is filtered. The filtrate is then cooled, whereby pure melamine is crystallized from the solution. The purity of the melamine is about 99.5% or better.

The following is a typical example of the apparatus used and one procedure for preparing melamine following the teachings of this invention.

EXAMPLE

Apparatus

The vessel used was a 1 gal. autoclave made of type 316 "Stainless Steel" lined with aluminum. Apart from the usual fittings, such as pressure gauge, bursting disc, etc., it had a turbine-type stirrer driven at 900 r.p.m. and was electrically heated over its whole area (including lid). Reactants entered via a tube inserted through the lid of the vessel. Product was discharged through a tube reaching from the bottom of the vessel up through the lid and carrying two valves (one as a safeguard in case the other failed) which by manual operation released material to a collecting vessel at ordinary pressure. A scrubber attached to the collecting vessel prevented loss of melamine as fume. The discharge lines and valves were melamine as fume. The discharge lines and valves were all heated electrically to the same temperature as that chosen for the reaction.

Urea/oil dispersion (made as described below) was delivered from a storage reservoir to a high pressure proportioning pump which forced it into the line feeding the autoclave. Ammonia was also pumped into this feed line via a T-connection so that it mixed with the stream of urea/oil dispersion. The feed line was made of type 304 "Stainless Steel" except for the final two feet which was of titanium and was electrically heated, to provide the necessary preheating step.

Feed

One part by weight of urea was added to five parts by weight of White Oil No. 9, and ball milled for 48 hours using porcelain balls. The product was filtered through cheesecloth then diluted (if desired) with the requisite amount of White Oil No. 9 to give the dispersion strength required.

Typical experiment

The system was purged with nitrogen or ammonia to remove air. Then 2000 cc. of White Oil No. 9 was pumped in (via the urea/oil feed line). Heaters were turned on and, when reaction temperature was reached in the autoclave, oil and ammonia were pumped in to raise the pressure to that desired. When the desired pressure had been attained and temperatures had steadied, the oil feed was switched to urea/oil dispersion feed. After a stipulated time, the urea/oil feed was stopped and changed to straight oil feed. This was continued for one hour (still also pumping ammonia) to ensure all melamine was removed from the system. The unit was then cooled and the pressure released.

As an example of actual conditions, the feed line temperature was 170–173° C.; reaction temperature in the autoclave was 350° C.; led-down lines and valves 340–350° C.; pressure was 1500 p.s.i.; average rate of urea/oil feed was 2740 g./hour of a 1:8 dispersion by weight, i.e., 304 g. urea/hour; ammonia feed rate was about 800 cc./hour. The duration of the run was 165 min. (not including the final one hour's pumping of just oil and ammonia). Assay of the effluent material showed that a total of 281 g. melamine had been formed representing a 96% yield. There was only a very small amount of product left behind in the reaction vessel.

In the above example the ratio of ammonia to urea is 800 cc. $NH_3$ (about 500 g.) for 304 g. urea, a weight ratio of 5:3. In large scale practice, a lower ratio would be used.

I claim:
1. A continuous process for the preparation of melamine from urea which process comprises:
   (a) continuously forming a dispersion of urea in an inert liquid;
   (b) continuously adding ammonia to said dispersion to produce an ammonia-containing dispersion;
   (c) continuously preheating said ammonia-containing dispersion to a temperature not exceeding 250° C.;
   (d) continuously passing said preheated ammonia-containing dispersion into a reaction zone maintained at a temperature of 330–350° C. and at an elevated pressure;
   (e) continuously withdrawing a mixture of inert liquid and reaction products from said reaction zone; and
   (f) recovering melamine from said withdrawn mixture.

2. A process according to claim 1 wherein the pressure within said reaction zone is maintained within the range of 1000–4000 p.s.i.

3. A process according to claim 1 wherein the pressure in said reaction zone is maintained within the range of 1000–4000 p.s.i., the retention time within said reaction zone being 20–25 minutes.

4. The process of claim 1, wherein said recovery of said melamine from said withdrawn mixture includes the steps of:
   (a) separating reaction product from said inert liquid;
   (b) recycling said inert liquid to the dispersion-forming step; and
   (c) recovering substantially pure melamine from said separated reaction product.

5. The process of claim 2 wherein said recovery of said melamine from said withdrawn mixture includes the steps of:
   (a) separating reaction product from said inert liquid;
   (b) recycling said inert liquid to the dispersion-forming step; and
   (c) recovering substantially pure melamine from said separated reaction product.

6. The process of claim 3, wherein said recovery of said melamine from said withdrawn mixture includes the steps of:
   (a) separating reaction product from said inert liquid;
   (b) recycling said inert liquid to the dispersion-forming step; and
   (c) recovering substantially pure melamine from said separated reaction product.

7. The process of claim 1, wherein said inert liquid is a highly refined paraffinic hydrocarbon oil.

8. The process of claim 2 wherein said inert liquid is a highly refined paraffinic hydrocarbon oil.

9. The process of claim 3 wherein said inert liquid is a highly refined paraffinic hydrocarbon oil.

References Cited

FOREIGN PATENTS 743,956  10/1966  Canada.
944,685  12/1963  Great Britain.

JOHN D. RANDOLPH, *Primary Examiner.*

J. M. FORD, *Assistant Examiner.*